Figure 1:
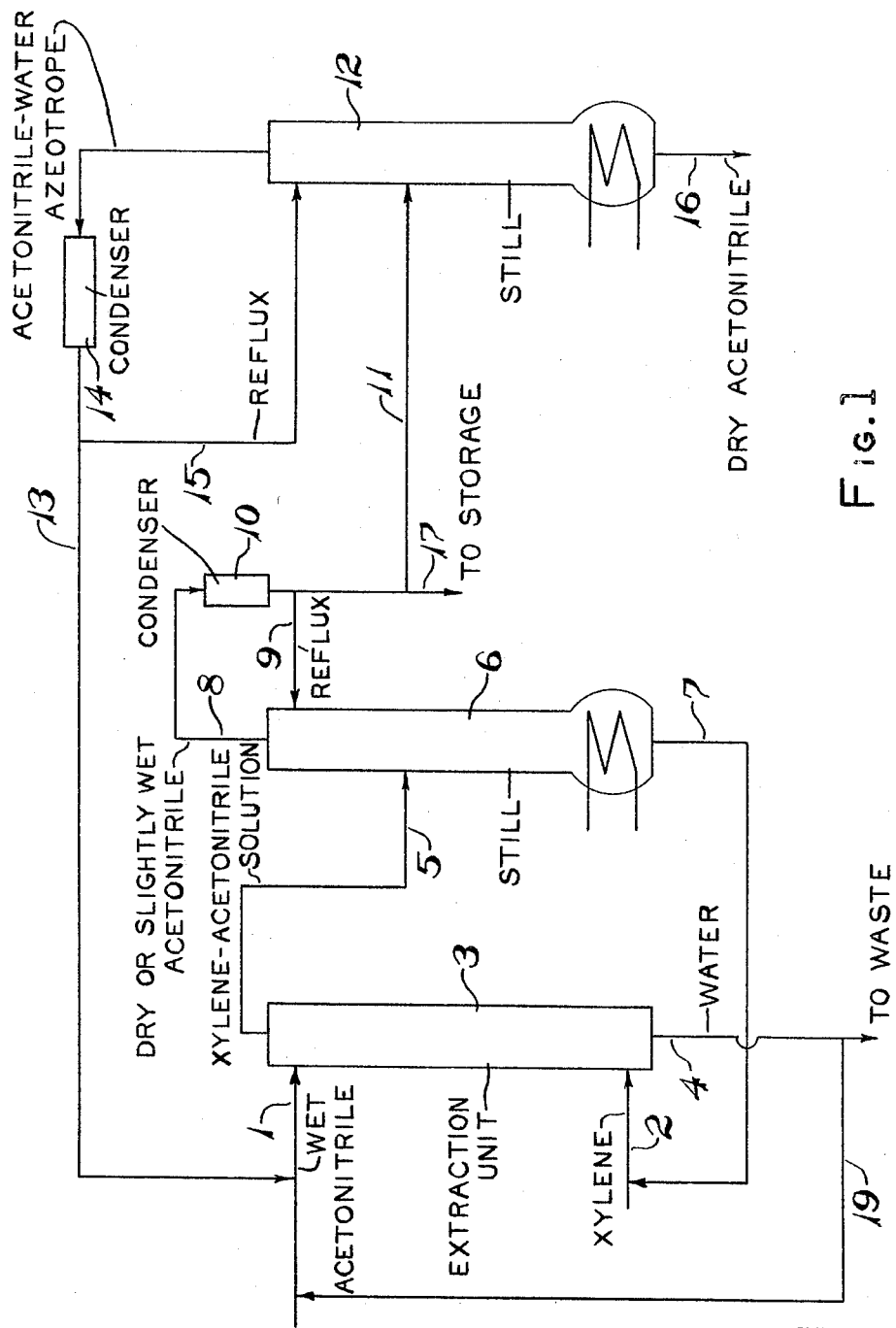

Oct. 25, 1966 P. J. HORVATH 3,281,450
PURIFICATION OF ACETONITRILE
Filed Sept. 27, 1963 4 Sheets-Sheet 1

INVENTOR.
PAUL J. HORVATH
BY Stanley Litz
ATTY.

TERNARY PHASE DIAGRAM

VAPOR-LIQUID EQUILIBRIUM RELATIONSHIP FOR ACETONITRILE-XYLENE SYSTEM AT ATMOSPHERIC PRESSURE

United States Patent Office 3,281,450
Patented Oct. 25, 1966

3,281,450
PURIFICATION OF ACETONITRILE
Paul J. Horvath, Elyria, Ohio, assignor to The B. F. Goodrich Company, New York, N.Y., a corporation of New York
Filed Sept. 27, 1963, Ser. No. 312,027
1 Claim. (Cl. 260—465.1)

This invention relates to a method for purifying acetonitrile and more particularly relates to a process for dehydrating an acetonitrile-water solution which comprises the steps of treating said solution with xylene solvent, thereby forming a xylene-acetonitrile solution which is then separated from the water phase, and then separating the acetonitrile from the xylene solvent.

The use of acetonitrile in the chemical process industries has become more common in recent years. Some methods are known for the production of acetonitrile in which the product is contaminated with water and requires further purification. Frequently, the nature of the process in which the acetonitrile is employed results in its contamination with water, which water must be substantially or completely removed therefrom in order to render the acetonitrile sufficiently pure for reuse in the process. It is known that acetonitrile forms a minimum boiling binary azeotrope with water and that the azeotrope contains 16.3% water. Thus, anhydrous acetonitrile can be obtained from mixtures with water that contain less than 16.3% water by distilling off the binary azeotrope. But this separation method only permits part of the acetonitrile (the column bottoms) to be recovered in anhydrous form and is not adaptable to acetonitrile-water mixtures containing more than 16.3% water. It is known that the water-acetonitrile minimum boiling azeotrope can be avoided by employing low pressure distillation, as shown by the following data.

| Pressure, mm. of Hg | Binary Azeotrope Temp., °C. | Binary Composition | |
|---|---|---|---|
| | | Weight percent Acetonitrile | Weight percent Water |
| 760 | 76.5 | 83.7 | 16.3 |
| 50 | 12.0 | 94.2 | 5.8 |
| 10 | −16.0 | 97.4 | 2.6 |

The low-pressure distillation method, however, is commercially uneconomical because of the relatively high costs of vacuum operations and the refrigeration costs associated with the condensation of the low boiling azeotrope. Many other methods are found in the literature for dehydrating acetonitrile-water mixtures, for example, adding a suitable organic liquid to the mixture, which material forms a ternary azeotrope with the other constituents boiling below the boiling point of the nitrile. A disadvantage of this method is the economic necessity for recovering the acetonitrile from the distilled ternary azeotrope. Another method involves adding a suitable organic liquid to the acetonitrile-water mixture which forms a binary azeotrope with water which has a lower boiling point than that of the nitrile or the acetonitrile-water binary azeotrope. This method is not always economically feasible because a large amount of the entraining agent is required and distillation costs are high when the acetonitrile contains a large amount of water. Other methods have been devised wherein the acetonitrile-water solution is treated with water-absorbent solids such as activated alumina and calcium chloride. These processes usually involve non-steady state operation yielding a product of non-uniform quality, and, in addition, the absorbent material must be frequently regenerated. Another quite expensive procedure entails cooling the mixture to −9° C., thus forming an ice phase and a liquid phase rich in acetonitrile, and separating the two phases. In yet another method the mixture is treated with ammonium carbonate to cause the formation of two layers, one enriched with acetonitrile. Unfortunately, the ammonium carbonate is destroyed in the process and cannot be recovered by recycling.

It is the object of this invention to provide a simple, economical process for the dehydration of an acetonitrile-water mixture and the subsequent recovery of pure acetonitrile, which method is adaptable to mixtures encompassing a wide range of water concentrations. Moreover, the process is accomplished with an insignificant loss of valuable materials.

The method of the present invention is a combination of steps comprising (a) treating a mixture of acetonitrile and water with xylene, thereby extracting the acetonitrile from the nitrile-water mixture and forming a xylene-acetonitrile phase and a denser aqueous layer, (b) separating these two immiscible phases and (c) subjecting the xylene-acetonitrile phase to a distillation operation to separate the components thereof. As aforementioned, the method is suitable for treatment of acetonitrile-water mixtures, hereinafter sometimes referred to as wet acetonitrile, of widely varying composition, for instance, those containing from about 10 to about 85% acetonitrile and correspondingly 90 to 15% water by weight.

The treatment of the acetonitrile-water solution with the xylene solvent according to this invention is a conventional liquid-liquid extraction operation which may, on infrequent occasions, be single contact, but is ordinarily a multistage operation. The multistage contact may be cocurrent, i.e., where the wet acetonitrile is treated with separate portions of fresh solvent in a separate series of successive steps or stages. However, countercurrent continuous multistage contact is preferred, in which conventional extraction apparatus may be used, for example, mixer-settler units, packed towers, sieve or perforated plate columns, baffled columns, modified bubble plate towers, columns with internal agitators and others.

The weight ratio of the xylene solvent to the wet acetonitrile feed in the extraction step generally is within the range of about 0.5:1 to about 4:1, with from about 0.5:1 to 2:1 being preferred to obtain the best balance of product purity and economy of operation. The extraction temperature may range from about 10 to about 70° C. but ambient temperatures, i.e., 15 to about 40° C., are of course advantageous and preferred. Xylene is the solvent uniquely adapted to this process for the following reasons. It is a preferential solvent for the acetonitrile, the xylene-acetonitrile phase and water phase are immiscible and separate cleanly, the xylene has neglible solubility in water and, conversely, water has neglible solubility in xylene. Thus there is a negligible xylene loss to the raffinate water leaving the extractor and the xylene-acetonitrile extract layer contains none or very little water (0 to 3%). Furthermore, the subsequent separation of the extract components is accomplished using simple rectification techniques and conventional apparatus, e.g., packed columns or plate towers, since the solution is essentially a single phase binary mixture of components which have a reasonably high relative volatility and which do not form a "constant-boiling mixture" (azeotrope). Significantly, benzene and toluene, homologues of xylene, are not suited for the process embodied herein as they form azeotropes with acetonitrile, consisting of 57% and 22% of the hydrocarbon by volume, respectively. It is understood that the term "xylene" as used herein refers to any of the isomers of the compound and mixtures thereof, the mixed xylenes being the form readily and commercially available and thus preferred.

The distillate from the acetonitrile-xylene separation step consists of acetonitrile containing from 0 to 2% of water, the water content depending on the specific composition of the wet acetonitrile feed to the extraction unit, the ratio of xylene to wet acetonitrile employed therein, and the number of stages and efficiency of the unit. When the aforesaid acetonitrile distillate contains a small amount of water, it may be considered substantially anhydrous for some purposes, however, the slight water contamination therein may be even further reduced by subjecting the product to a rectification step wherein any remaining water is removed as the water-acetonitrile azeotrope distillate and water-free acetonitrile recovered as still bottoms.

When the wet acetonitrile feed contains less than about 30% of the nitrile, it has been found to be advantageous, although not necessary, to modify the process by initially removing some of the water in a rectification unit preceding the solvent extraction. In this optional distillation step, the wet acetonitrile may be concentrated to about 30 to 80% acetonitrile, preferably 40–80%, which preconcentration permits the use of relatively less xylene in the extraction step to obtain comparative degrees of dehydration.

In the specific embodiments and examples of the invention described herein, the compositions of the solutions and mixtures are given in percent by weight and "parts" of a substance refers to parts by weight unless otherwise indicated.

Figure 2:
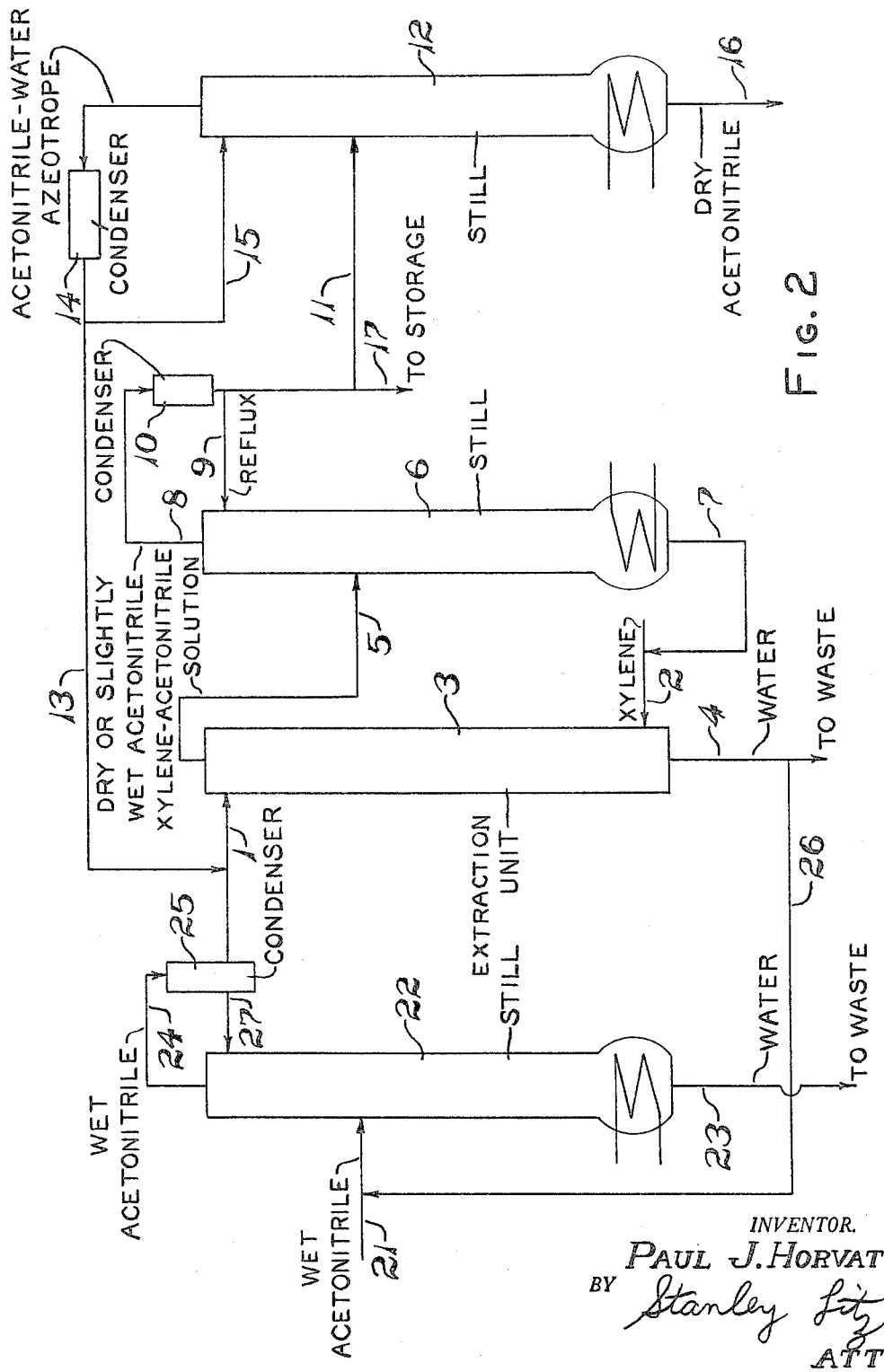

The process may be readily understood by referring to the accompanying drawings, FIGS. 1 and 2, which are diagrammatic flow-sheets of the operation carried out in a continuous manner. It is of course contemplated that the process is adaptable to batch operation but this is less preferred for economic reasons. The process illustrated in FIGURE 2 is the same as shown in FIGURE 1 except for the preliminary concentrating still provided before the extraction unit.

In FIGURE 1, a "wet acetonitrile" stream 1, (e.g., an acetonitrile-water solution containing from about 10 to 85 percent acetonitrile) is fed into the top of the extraction unit 3, countercurrently to the xylene solvent stream 2 being fed to the bottom of the extraction unit. Raffinate stream 4, the effluent water phase, leaves the bottom of the extraction unit 3 and may either be discarded or any portion thereof recycled as stream 19 to wet acetonitrile stream 1 if it contains an appreciable amount of acetonitrile; the acetonitrile content of the raffinate stream depends on the ratio of the xylene feed to the wet acetonitrile feed, the latter stream's composition, and the number of stages and efficiency in the extraction unit. Extract stream 5, the xylene-acetonitrile solution phase containing from about 2 to 60% of acetonitrile and perhaps a slight amount of water, leaves the top of the extraction unit and is fed to still 6, a distillation column equipped with a sufficient number of trays to adequately separate the xylene and acetonitrile. Essentially pure xylene 7 is taken from the bottom of the still and recycled to the extraction unit 3 as part of stream 2. The still distillate vapor 8, composed of dry or "slightly wet" acetonitrile, i.e., containing 0 to 2% of water, is taken overhead to condenser 10. A portion of the condensate may be returned as reflux 9 to the still 6. If it is of sufficient dryness for use in the contemplated plant operations, it is sent to storage through line 17. If it contains a small amount of water contamination, as aforementioned, and an essentially dry acetonitrile product is desired, the condensate 11 is fed to purification still 12. The overhead distillate from this tower, an acetonitrile-water azeotropic mixture (16.3% water) is condensed in a condenser 14 from which reflux 15 is returned to the top of the still and from which condensate 13, which is normally not greater in amount than ten percent of the feed to the still (stream 11), is recycled to the wet acetonitrile feed stream 1 to the extraction unit. The bottoms from purification still 12 is essentially dry acetonitrile, designated as stream 16.

In FIGURE 2, wet acetonitrile stream 21 (usually containing 5 to 30% acetonitrile) is fed to still 22, a preliminary distillation unit for decreasing the water content of the wet acetonitrile prior to the xylene extraction treatment thereof. The still bottoms is essentially acetonitrile-free water and is discarded as stream 23. The distillate 24 from still 22 is taken overhead and condensed in a condenser 25. The wet acetonitrile overhead product, which contains from about 30 to 80% of acetonitrile depending on the concentration of the feed to the still, the number of trays therein, the amount of the reflux 27 returned thereto and the unit's overall efficiency. The wet acetonitrile condensate 1 is fed to extraction unit 3. The remainder of the flow sheet of FIGURE 2, including its attendant description, is the same as in FIGURE 1, except that the raffinate water stream 4 from the extraction unit may, if it contains an appreciable amount of acetonitrile, be recycled with the feed to the preliminary concentrating still. The inclusion of the described preconcentration step in the process permits the use of a lesser quantity of extract purity, and in addition, permits recycle of a raffinate therefrom containing a comparatively high amount of acetonitrile (up to about 5%) without a significant loss in extraction efficiency.

Figure 3:
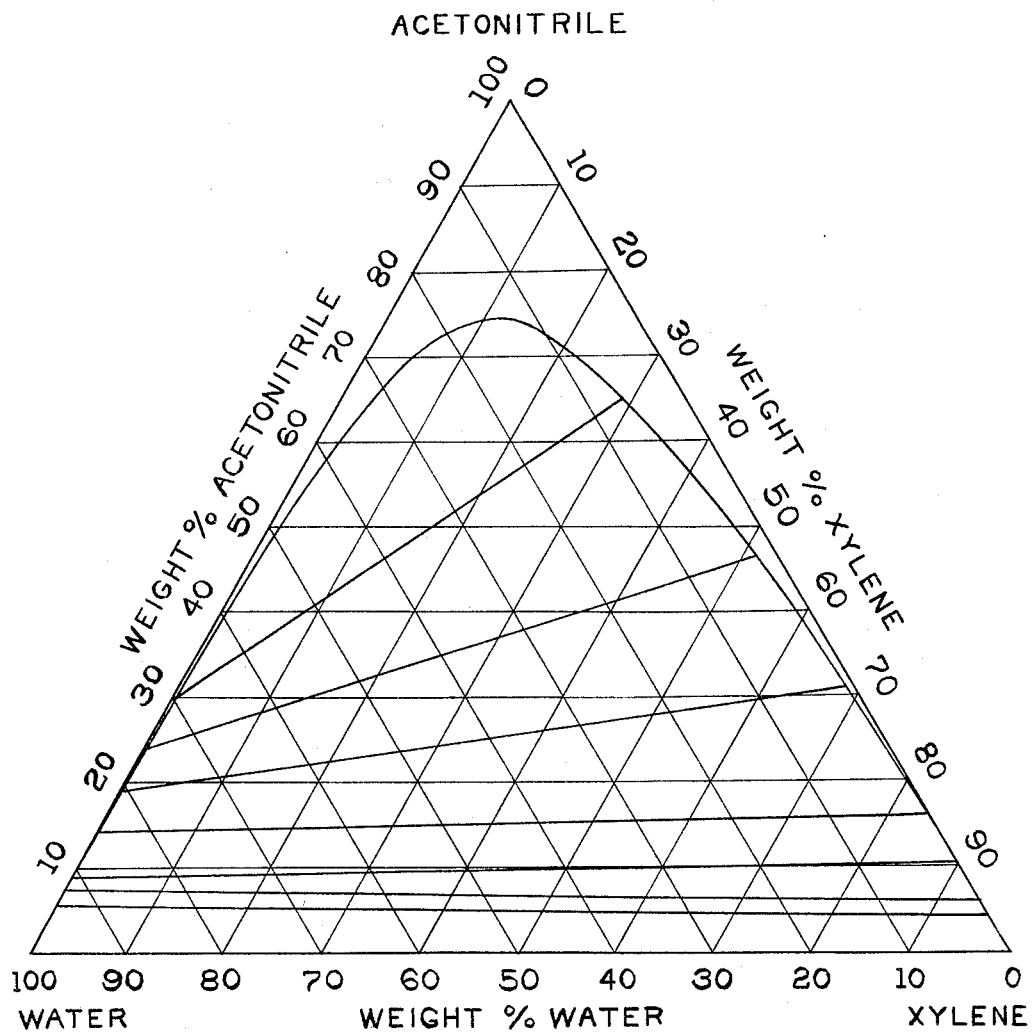

FIGURE 3 is a conventional triangular phase diagram for the ternary system of the components acetonitrile, xylene and water at 25° C., which relationship has been developed to enable one skilled in the art to make the various, well-known design calculations required for efficient utilization of the extraction process described herein. For example, the table below shows the number of theoretical stages needed in the extraction unit for wet acetonitrile feeds having several water contents and at several ratios of xylene solvent to wet acetonitrile feed, two concentrations of acetonitrile in the raffinate phase, and at various concentrations of water in the xylene-acetonitrile extract phase. Symbols used in the table for the sake of brevity are:

MeCN=acetonitrile (methyl cyanide)
X=xylene

Figure 4:
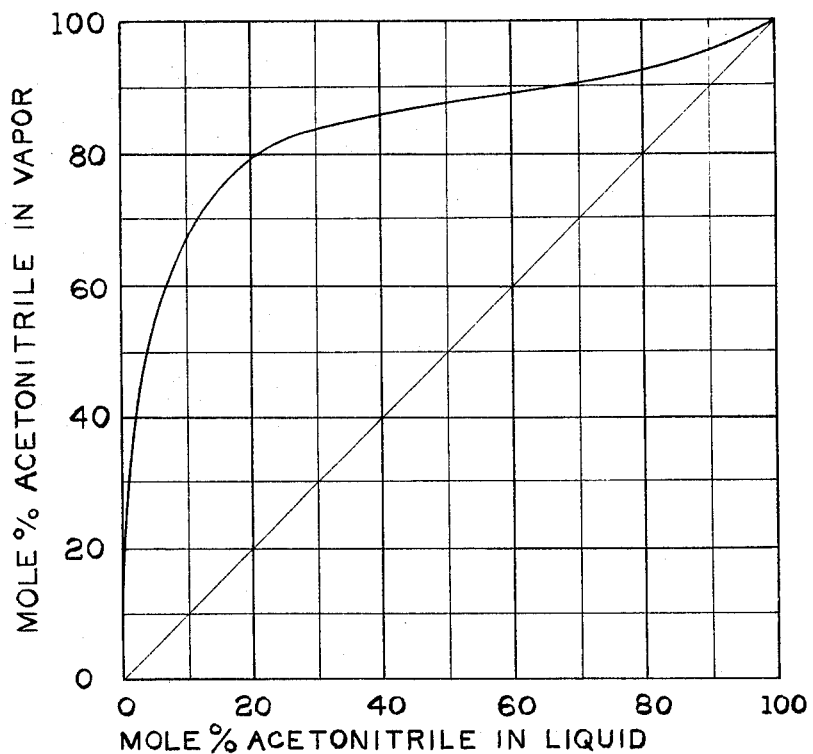

FIGURE 4 is a graphic presentation of the liquid-vapor equilibrium relationship for the acetonitrile-xylene binary system which was developed to enable one skilled in the art to perform the well-known calculations for establishing the conditions for the operation of the acetonitrile-xylene separation still, e.g., the number of trays, optimum reflux ratio, etc.

The following experimental examples are next presented to further illustrate the invention.

| Wet Acetonitrile Feed, Percent MeCN | Parts of Xylene per one part of Wet Acetonitrile | Raffinate, Percent MeCN | Extract | | | Theoretical Extraction Stages |
|---|---|---|---|---|---|---|
| | | | Percent MeCN | Percent X | Percent H$_2$O | |
| 10 | 1.5 | 1 | 6.0 | 94.0 | Nil | 9 |
| 10 | 2 | 1 | 4.5 | 95.9 | Nil | 5 |
| 10 | 0.5 | 5 | 9.8 | 90.2 | Nil | 6 |
| 10 | 1 | 5 | 5.0 | 95.0 | Nil | 1.6 |
| 10 | 1.5 | 5 | 3.8 | 96.2 | Nil | 1.2 |
| 10 | 2 | 5 | 2.7 | 97.3 | Nil | 1 |
| 35 | 1 | 1 | 25.6 | 74.0 | 0.4 | 15 |
| 35 | 1.5 | 1 | 19.0 | 80.8 | 0.2 | 6 |
| 35 | 2 | 1 | 14.7 | 85.0 | 0.1 | 5 |
| 35 | 0.5 | 5 | 38.6 | 60.0 | 1.4 | 6.6 |
| 35 | 1 | 5 | 24.1 | 75.7 | 0.2 | 3 |
| 35 | 1.5 | 5 | 17.8 | 82.0 | 0.2 | 2.5 |
| 35 | 2 | 5 | 13.8 | 86.1 | 0.1 | 2 |
| 60 | 1 | 1 | 37.0 | 62.0 | 1.0 | 6 |
| 60 | 1.5 | 1 | 28.6 | 70.7 | 0.7 | 5 |
| 60 | 2 | 1 | 23.0 | 76.8 | 0.2 | 4 |
| 60 | 0.5 | 5 | 52.0 | 44.7 | 3.3 | 4.3 |
| 60 | 1 | 5 | 36.2 | 62.7 | 1.1 | 2.8 |
| 60 | 1.5 | 5 | 27.7 | 71.5 | 0.8 | 2.4 |
| 60 | 2 | 5 | 22.4 | 77.4 | 0.2 | 2.1 |
| 85 | 0.5 | 1 | 60.0 | 35.0 | 5.0 | 5 |
| 85 | 1 | 1 | 45.0 | 52.9 | 2.1 | 4 |
| 85 | 1.5 | 1 | 35.9 | 63.0 | 1.1 | 3 |
| 85 | 2 | 1 | 30.0 | 69.2 | 0.8 | 3 |
| 85 | 0.5 | 5 | 60.0 | 35.0 | 5.0 | 2.7 |
| 85 | 1 | 5 | 45.0 | 52.8 | 2.2 | 2.3 |
| 85 | 1.5 | 5 | 35.5 | 63.5 | 1.0 | 2.0 |
| 85 | 2 | 5 | 29.7 | 69.6 | 0.7 | 1.9 |

*Example I*

A 29.4% acetonitrile–70.6% water solution was fed at 6.15 grams per minute into the top of an extraction column 50 inches high and 1.75 inches in diameter packed with ¼ inch berl saddles, while 11.3 grams per minute of xylene was fed into the bottom of the column. The treatment temperature was 21° C. The water raffinate taken from the bottom of the extraction unit contained less than about 2% of acetonitrile. The organic extract phase was taken from the top of the extractor and fed to an acetonitrile-xylene separation still consisting of a one inch diameter, 64 inch long column packed with ¼ inch berl saddles and equipped with a thermo-siphon reboiler, electrical resistance heaters, temperature sensing elements and a liquid splitter reflux head. The feed entrance was located 40 inches from the column bottom. The reboiler temperature was 138–141° C., the overhead temperature was 80° C. and the reflux ratio was 2:1. The bottoms product was essentially pure xylene and was recycled to the surge tank supplying the xylene feed to the extractor. The condensate product was acetonitrile containing about 0.6% of water. This stream was pumped to a final purification (dehydration) still consisting of a column 7.5 ft. long, one inch in diameter, packed with ¼ inch berl saddles and equipped with the same auxiliaries as the previous distillation column. The feed entrance was 5.25 feet from the bottom of the column. The reflux ratio was 10:1, the overhead temperature was 71° C. and the bottoms temperature 81° C. The bottoms product was essentially dry acetonitrile containing 0.2% water. The small amount of overhead product was a binary mixture of acetonitrile and water.

*Example II*

The equipment and general operating techniques used in this test were those described in Example I. The wet acetonitrile feed to the extraction unit was 3.4 grams per minute of a 70% acetonitrile–30% water solution and the xylene feed rate was 7 grams per minute. The raffinate from the extractor contained less than 2% acetonitrile. The separation still for the xylene-acetonitrile extract phase was operated with a 1:1 reflux ratio. The acetonitrile distillate, which contained about 2% water, was fed to the optional purification still, from which it was recovered as bottoms product containing 0.88% water.

It is understood that the specific embodiments described in the examples and flow diagrams are for purposes of illustration only and are not meant to limit the invention, which is obviously subject to variations and modifications without departing from the spirit and scope thereof as defined in the appended claim.

I claim:

A method for dehydrating wet acetonitrile which comprises the steps of (a) contacting a mixture consisting essentially of 10 to 85 weight percent acetonitrile and 90 to 15 weight percent water with xylene, wherein the weight ratio of xylene to the acetonitrile-water mixture is within the range of about 0.5:1 to about 4:1, thereby extracting at a temperature from about 10 to about 70° C. the acetonitrile from said mixture and forming a xylene-acetonitrile solution extract phase and an aqueous raffinate phase, which phases are immiscible, (b) separating the extract from the raffinate phase, and (c) separating the acetonitrile from the xylene by distillation of said extract phase.

References Cited by the Examiner

UNITED STATES PATENTS 2,305,106   12/1942   Pratt _____ 260—465.1 XR
2,848,387   8/1958   Glazier et al. __ 260—465.1 XR CHARLES B. PARKER, *Primary Examiner.*

JOSEPH P. BRUST, *Assistant Examiner.*